United States Patent
Kitahara et al.

(10) Patent No.: US 7,443,779 B2
(45) Date of Patent: Oct. 28, 2008

(54) OBJECTIVE OPTICAL SYSTEM FOR OPTICAL RECORDING MEDIA AND OPTICAL PICKUP DEVICE USING IT

(75) Inventors: Yu Kitahara, Saitama (JP); Tetsuya Ori, Koshigaya (JP); Toshiaki Katsuma, Tokyo (JP); Masao Mori, Saitama (JP); Hiromitsu Yamakawa, Saitama (JP)

(73) Assignee: Fujinon Corporation, Saitama (JP)

( * ) Notice: Subject to any disclaimer, the term of this patent is extended or adjusted under 35 U.S.C. 154(b) by 568 days.

(21) Appl. No.: 11/019,203

(22) Filed: Dec. 23, 2004

(65) Prior Publication Data
US 2005/0141392 A1  Jun. 30, 2005

(30) Foreign Application Priority Data
Dec. 26, 2003  (JP) .............................. 2003-433434

(51) Int. Cl.
*G11B 7/00*  (2006.01)
(52) U.S. Cl. ............................... 369/112.1; 369/112.03
(58) Field of Classification Search .............. 369/112.1, 369/112.01, 112.02, 112.06, 44.23, 44.24, 369/117.07, 44.37, 112.03, 112.04, 112.07
See application file for complete search history.

(56) References Cited
U.S. PATENT DOCUMENTS

| | | | |
|---|---|---|---|
| 6,650,477 B2 | 11/2003 | Nakai | |
| 7,180,846 B2 * | 2/2007 | Kim et al. | 369/112.17 |
| 7,260,047 B2 * | 8/2007 | Nishioka et al. | 369/112.05 |
| 2001/0008513 A1 | 7/2001 | Arai et al. | |
| 2002/0181366 A1 | 12/2002 | Katayama | |
| 2003/0185134 A1 | 10/2003 | Kimura et al. | |

OTHER PUBLICATIONS

U.S. Appl. No. 10/972,670, filed Oct. 26, 2004.
U.S. Appl. No. 10/922,958, filed Aug. 23, 2004.

\* cited by examiner

*Primary Examiner*—Nabil Z Hindi
(74) *Attorney, Agent, or Firm*—Arnold International; Jon W. Henry; Bruce Y. Arnold

(57) ABSTRACT

An objective optical system includes a diffractive optical element on the light source side of an objective lens for focusing incident light of three different wavelengths with two different numerical apertures onto three different optical recording media. The diffractive optical element is formed of two lens elements made of different materials that are cemented together at a diffractive surface. Three conditions are satisfied so as to achieve optimum imaging. The diffractive surface may be shaped so that the order of the diffracted light of the shortest wavelength $\lambda 2$ having the largest diffracted intensity is different from the order of the diffracted light of the second wavelength $\lambda 2$ having the largest diffracted intensity, and the order of the diffracted light of the first wavelength $\lambda 1$ having the largest diffracted intensity is also different from the order of the diffracted light of the third wavelength $\lambda 3$ having the largest diffracted intensity.

20 Claims, 5 Drawing Sheets

OBJECTIVE OPTICAL SYSTEM FOR OPTICAL RECORDING MEDIA AND OPTICAL PICKUP DEVICE USING IT

FIELD OF THE INVENTION

The present invention relates to an objective optical system that includes a diffractive optical element and an optical pickup device that uses such an objective optical system for recording or reproducing information with one of three different light beams of different wavelengths. Each beam of light is efficiently focused on a corresponding one of three different types of optical recording media with different technical standards, including different numerical apertures of the objective optical system for each of the three different wavelengths used and different substrate thicknesses of the different optical recording media. The diffractive optical element includes a diffractive surface that diffracts the light of three different wavelengths differently so that the diffracted light beam of each wavelength is efficiently focused at a desired distance along the optical axis of the objective optical system where a recording region of the corresponding recording medium may be located.

BACKGROUND OF THE INVENTION

In response to the development of various optical recording media in recent years, optical pickup devices that can record information on and reproduce information from two types of optical recording media have been commonly used. For example, devices that carry out recording and reproducing information with either a DVD (Digital Versatile Disk) or a CD (Compact Disk including CD-ROM, CD-R, CD-RW) have been used.

For these two types of optical recording media, the DVD uses visible light having a wavelength of approximately 657 nm for improved recording densities, while the CD is required to use near-infrared light having a wavelength of approximately 790 nm because there are some optical recording media that have no sensitivity to visible light. A single optical pickup device, known as a double wavelength pickup device, uses incident light of these two different wavelengths. The two optical recording media described above require different numerical apertures (NA) due to their different features. For example, the DVD is standardized to use light having a numerical aperture of about 0.6 through 0.65 and the CD is standardized to use light having a numerical aperture of about 0.45 through 0.52. Additionally, in these optical recording media, the substrate thickness, the thicknesses of the two types of recording disks, including the thicknesses of the protective layers or substrates made of polycarbonate (PC), are different. For example, the DVD may have a substrate thickness of 0.6 mm and the CD may have a substrate thickness of 1.2 mm.

As described above, because the substrate thickness of the optical recording medium is standardized and differs according to the type of optical recording medium, the amount of spherical aberration introduced by the substrate is different based on the different standardized thicknesses of the substrates of the different optical recording media. Consequently, for optimum focus of each of the light beams on the corresponding optical recording medium, it is necessary to optimize the amount of spherical aberration in each light beam at each wavelength for recording and reproducing. This makes it necessary to design the objective lens with different focusing effects according to the light beam and recording medium being used.

Additionally, in response to rapid increases of data capacity, the demand for an increase in the recording capacity of optical recording media has been strong. It is known that the recording capacity of an optical recording medium can be increased by using light of a shorter wavelength and by increasing the numerical aperture (NA) of an objective optical system. Concerning a shorter wavelength, the development of a semiconductor laser with a shorter wavelength using a GaN substrate (for example, a semiconductor laser that emits a laser beam of 408 nm wavelength) has advanced to the point where this wavelength is becoming practical. With the development of short wavelength semiconductor lasers, research and development of AODs (Advanced Optical Disks), also known as HD-DVDs, that provide an increased data storage capacity of approximately 20 GB with a single layer on one side of an optical disk by using light of shorter wavelength, has similarly progressed. As the AOD technical standard, the numerical aperture and disk thickness have been selected to be about the same as those of DVDs, as discussed previously, with the numerical aperture (NA) and disk substrate thickness for an AOD being set at 0.65 and 0.6 mm, respectively.

Furthermore, research and development of Blu-ray disk (BD) systems that use a shorter wavelength of disk illuminating light, similar to AOD systems, have also progressed. Moreover, the technically standardized values of numerical aperture and disk thickness for these systems are completely different from the corresponding DVD and CD values, with a numerical aperture (NA) of 0.85 and a disk substrate thickness of 0.1 mm being standard. Unless otherwise indicated, hereinafter AODs and Blu-ray disks collectively will be referred to as "AODs."

Accordingly, the development of an optical pickup device that can be commonly used for three different types of optical recording media, such as AODs, DVDs and CDs, as described above, has been desired and objective lenses for mounting in such devices have already been proposed.

Among these objective lenses, objective lenses that include a diffractive surface on at least one objective lens surface are described in Japanese Laid-Open Patent Application 2001-195769. The objective lens described in this publication uses the diffracted light of a specified order from the diffractive surface corresponding to each of the optical recording media, such as the next generation of high density optical disks that may use, for example, light of a wavelength of 400 nm, as well as using diffracted light of a wavelength used with a DVD and diffracted light of a wavelength used with a CD. This results in improvement in spherical aberration, which differs generally due to differences in thicknesses of the substrates of the different optical recording media that make different contributions of spherical aberration, and in improvement in chromatic aberration, which tends to be large in an objective lens formed as a single lens element.

In addition, the objective lens of Japanese Laid-Open Patent Application 2001-195769 is constructed so that a divergent light beam is incident on the diffractive surface when information is recorded on or reproduced from a CD. However, when information is recorded on or reproduced from the next generation of high density optical disk (which may use light of 400 nm wavelength), or from a DVD, the design is such that a collimated light beam is incident on the diffractive optical element in order to control the deterioration in tracking accuracy that occurs in conjunction with the deterioration of optical performance off the optical axis.

A design where collimated light beams are incident on the objective optical system for all three light beams of different wavelengths, as described previously, is demanded in order to increase the degree of freedom in the arrangement of an optical system in an optical pickup device, which, in turn, may enable meeting the strong demand for a compact device.

In particular, concerning the light beam with the shortest wavelength of the three light beams described previously, if a convergent light beam enters the diffractive optical element, the diffraction efficiency deteriorates due to the tilted incidence of the light on the diffraction grooves of the diffractive optical surface, and the tracking stability is remarkably reduced. Additionally, in the case of forming the diffractive optical element on the surface of a lens, as mentioned previously, the processing accuracy becomes extremely deteriorated if the surface of the lens has a large curvature.

Furthermore, although the above-mentioned Japanese Laid-Open Patent Application 2001-195769 is an example where all three light beams of different wavelengths, as described previously, enter into an objective optical system as collimated light, the diffraction order of the light being used is not specifically considered, so it is difficult to achieve high diffraction efficiency in a balanced manner for all three light beams of different wavelengths.

BRIEF SUMMARY OF THE INVENTION

The present invention relates to an objective optical system for an optical pickup device for recording and reproducing information data from any one of three different optical recording media using light beams of three different wavelengths that are diffracted by a diffractive optical element of the objective optical system. The objective optical system of the present invention enables efficient focusing of the three light beams at a respective desirable position on a corresponding one of three optical recording media, according to technical standards of the wavelengths of the three light beams, the numerical apertures of the objective optical system at the three wavelengths, and the substrate thicknesses of the substrates of the three optical recording media. The present invention further relates to such an objective optical system that increases the degree of freedom in arrangement of the optical system, increases the diffraction efficiency of a light beam to be used with the shortest of the three wavelengths (specifically an AOD generally), increases the stability of tracking, improves the optical performance, and enables the processing accuracy of the diffractive optical element to be improved. The present invention also relates to an objective optical system that achieves high diffraction efficiency in a balanced manner for all three light beams of different wavelengths. The present invention further relates to an optical pickup device that uses such an objective optical system.

BRIEF DESCRIPTION OF THE DRAWINGS

The present invention will become more fully understood from the detailed description given below and the accompanying drawings, which are given by way of illustration only and thus are not limitative of the present invention, wherein.

DETAILED DESCRIPTION

The present invention relates to an objective optical system for optical recording media that may be used to focus three light beams of wavelength $\lambda 1$, $\lambda 2$, and $\lambda 3$, respectively, from a light source to a different desired position for each of a first, second and third optical recording medium having a substrate thickness of T1, T2, and T3, respectively, for recording and reproducing information. As herein defined, unless otherwise indicated, the term "light source" refers to the source of the three light beams, whether the light beams originate from a single light-emitting source or from separate light-emitting sources such as semiconductor lasers. Additionally, the term "light source" may also include various optical elements, including beam splitters, mirrors, and converging lenses, which for one or more of the light beams of wavelengths $\lambda 1$, $\lambda 2$, and $\lambda 3$ may operate as a collimator lens to provide a collimated light beam incident on the objective optical system.

Figure 1A:
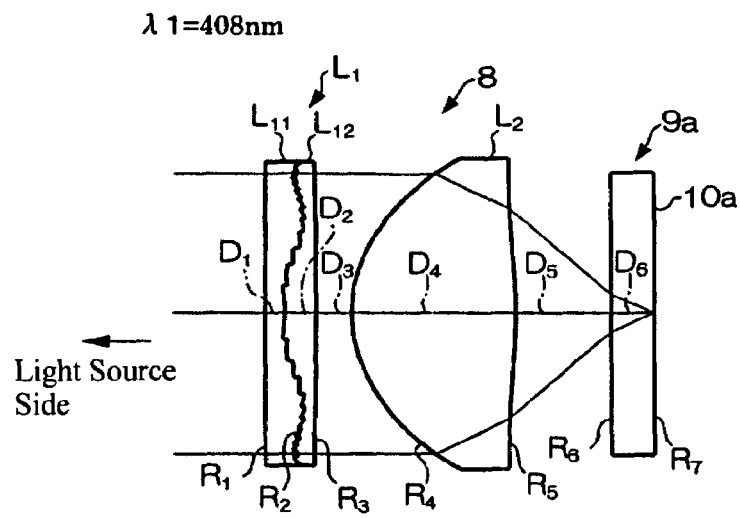
FIGS. 1A-1C are schematic diagrams that depict cross-sectional views of the objective optical system according to Embodiment 1 of the present invention, with FIG. 1A showing the operation of the objective optical system when used with a first optical recording medium 9a, with FIG. 1B showing the operation of the objective optical system when used with a second optical recording medium 9b, and with FIG. 1C showing the operation of the objective optical system when used with a third optical recording medium 9c.
Figure 1B:
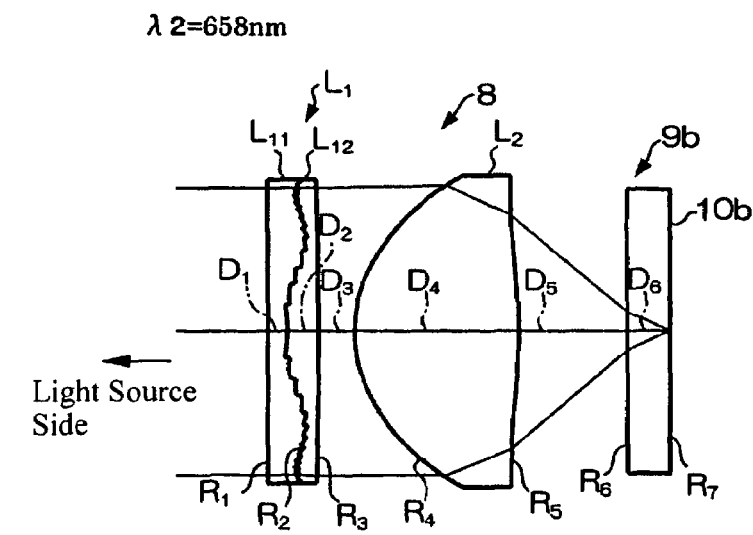
Figure 1C:
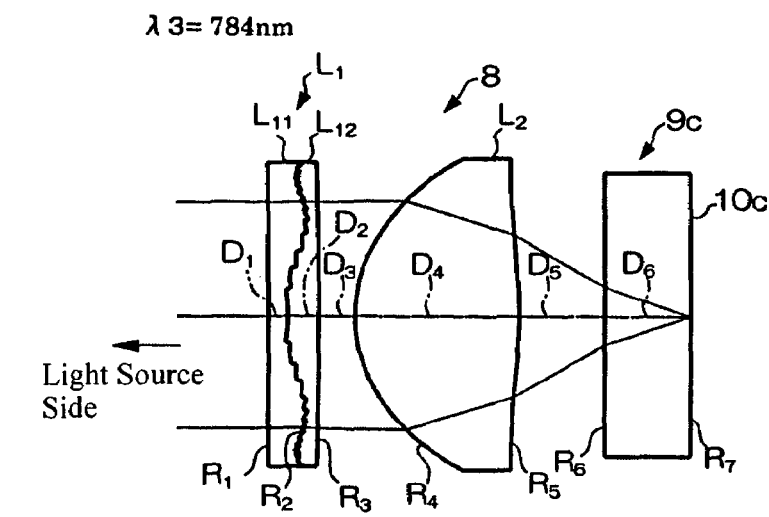
Figure 5:
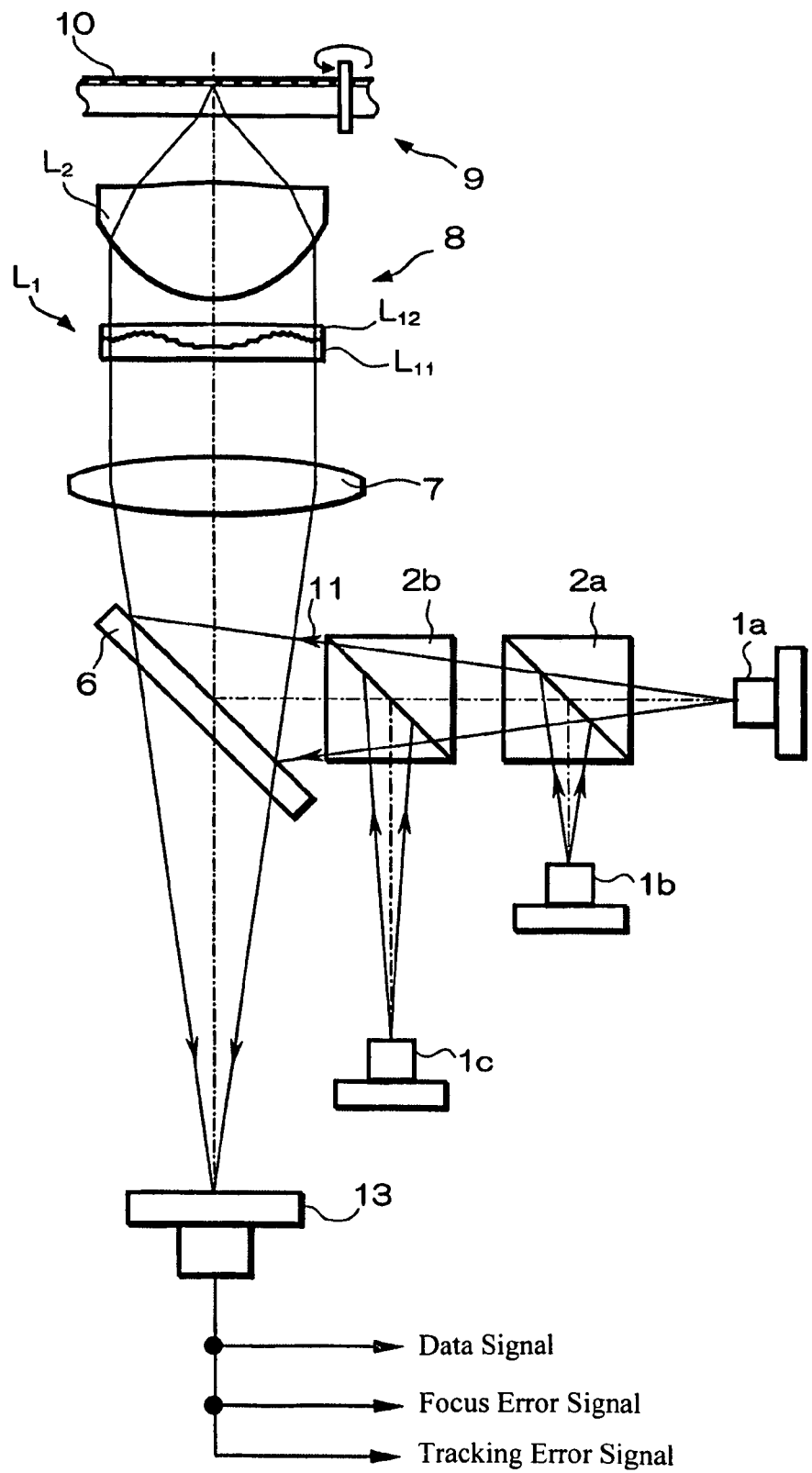
FIG. 5 is a schematic diagram of an optical pickup device that uses the objective optical system according to the embodiments of the invention.

An embodiment of the present invention will be described below with reference to the drawings, specifically with regard to FIGS. 1A-1C and FIG. 5 that illustrate many typical aspects of the present invention. FIGS. 1A-1C are schematic diagrams that depict cross-sectional views of the objective optical system according to Embodiment 1 of the present invention, with FIG. 1A showing the operation of the objective optical system when used with a first optical recording medium 9a, with FIG. 1B showing the operation of the objective optical system when used with a second optical recording medium 9b, and with FIG. 1C showing the operation of the objective optical system when used with a third optical recording medium 9c. FIG. 5 is a schematic diagram of an optical pickup device using the objective optical system according to Embodiment 1. In FIG. 5, in order to avoid complicating the drawing, the edges of the optical beam from the semiconductor laser 1a are fully shown, and the edges of the optical beams from the semiconductor lasers 1b and 1c are shown only until they reach prisms 2a and 2b.

Referring to FIG. 5, in the optical pickup device the laser beam 11 that is output from the semiconductor lasers 1a-1c, as shown in FIG. 5, is reflected by a half mirror 6, and is made into a collimated light beam by the collimator lens 7. Hereinafter, the term "collimated" means that any divergence or convergence of the light beam is so small that it can be neglected in computing the optical image forming properties of the objective optical system 8 for the light beam. The laser beam 11 is then converted to a convergent beam by the objective optical system 8 so that it is focused onto the recording region 10 of the optical recording medium 9.

Furthermore, as shown in FIGS. 1A-1C, the constitution of the objective optical system is illustrated as simply as possible in terms of lens elements. Definitions of the terms "lens element" and "lens component" that relate to this detailed description will now be given. The term "lens element" is herein defined as a single transparent mass of refractive material having two opposed refracting surfaces, which surfaces are positioned at least generally transversely of the optical axis of the single focus lens. The term "lens component" is herein defined as (a) a single lens element spaced so far from any adjacent lens element that the spacing cannot be neglected in computing the optical image forming properties of the lens elements or (b) two or more lens elements that have their adjacent lens surfaces either in full overall contact or overall so close together that the spacings between adjacent lens surfaces of the different lens elements are so small that the spacings can be neglected in computing the optical image forming properties of the two or more lens elements. Thus, some lens elements may also be lens components. Therefore, the terms "lens element" and "lens component" should not be taken as mutually exclusive terms. In fact, the terms may frequently be used to describe a single lens element in accordance with part (a) above of the definition of a "lens component."

In accordance with the definitions of "lens component," and "lens element" above, lens elements may also be lens components. Thus, the present invention may variously be described in terms of lens elements or in terms of lens components.

Additionally, a diffractive surface may be formed on a surface of a lens element. In this case, whether the lens element with the diffractive surface has an air space on each side to thereby define a lens component or contacts the surface of another lens element with the same curvature to form part or the whole of a lens component made of a plurality of lens elements, the lens component, which includes the diffractive surface, is also herein defined as a diffractive optical element. For example, in Embodiments 1 and 2 of the present invention, two lens elements are cemented together at a diffractive surface to form a diffractive optical element. Thus, the term "diffractive optical element" may refer to a single lens element that includes at least one diffractive surface or to a lens component that includes a plurality of lens elements and that includes at least one diffractive surface. In either case, the diffractive optical element may be properly referred to as a lens component, but only if the lens component includes only one lens element is the lens component properly referred to as a lens element.

The three optical recording media used in the present invention satisfy the following Conditions (1)-(3):

$NA1 \geq NA2 \geq NA3$          Condition (1)

$\lambda 1 < \lambda 2 < \lambda 3$            Condition (2)

$T1 \leq T2 < T3$            Condition (3)

where

NA1 is the numerical aperture of the objective optical system for light of the first wavelength $\lambda 1$ that is focused on the optical recording medium of substrate thickness T1, NA2 is the numerical aperture of the objective optical system for light of the second wavelength $\lambda 2$ that is focused on the optical recording medium of substrate thickness T2, and NA3 is the numerical aperture of the objective optical system for light of the third wavelength $\lambda 3$ that is focused on the optical recording medium of substrate thickness T3.

As shown in FIGS. 1A-1C, the arrangement includes an optical recording medium 9a that is an AOD with a substrate thickness T1 (not labeled) of 0.6 mm used with a light beam of wavelength $\lambda 1$ that is equal to 408 nm and with a numerical aperture NA1 (not labeled) of 0.65 (FIG. 1A), an optical recording medium 9b that is a DVD with a substrate thickness T2 (not labeled) of 0.6 mm used with a light beam of wavelength $\lambda 2$ that is equal to 658 nm and with a numerical aperture NA2 (not labeled) of 0.6 (FIG. 1B), and an optical recording medium 9c that is a CD with a substrate thickness T3 (not labeled) of 1.2 mm used with a light beam of wavelength $\lambda 3$ that is equal to 784 nm and with a numerical aperture NA3 (not labeled) of 0.50 (FIG. 1C).

The semiconductor laser 1a emits the visible laser beam having the wavelength of approximately 408 nm ($\lambda 1$) for an AOD. The semiconductor laser 1b emits the visible laser beam having the wavelength of approximately 658 nm ($\lambda 2$) for a DVD. The semiconductor laser 1c emits the near-infrared laser beam having the wavelength of approximately 784 nm ($\lambda 3$) for a CD such as a CD-R (recordable optical recording media, hereinafter the term CD generally represents CDs of all types).

The arrangement of FIG. 5 does not preclude semiconductor lasers 1a-1c providing simultaneous outputs. However, it is preferable that the lasers be used alternately depending on whether the optical recording media 9 of FIG. 5 is specifically, as shown in FIGS. 1A-1C, an AOD 9a, a DVD 9b, or a CD 9c. As shown in FIG. 5, the laser beam output from the semiconductor lasers 1a, 1b irradiates the half mirror 6 via prisms 2a, 2b, and the laser beam output from the semiconductor laser 1c irradiates the half mirror 6 via the prism 2b.

The collimator lens 7 is schematically shown in FIG. 5 as a single lens element. However, it may be desirable to use a collimator lens made up of more than one lens element in order to better correct chromatic aberration of the collimator lens 7 for the wavelengths that may be used.

In the optical pickup device of the present invention, each of the optical recording media 9, as shown in FIG. 5, whether an AOD 9a, a DVD 9b or a CD 9c shown in FIGS. 1A-1C, respectively, must be arranged at a predetermined position along the optical axis, for example, on a turntable, so that the recording region 10 of FIG. 5 (one of recording regions 10a, 10b, and 10c of an AOD 9a, a DVD 9b and a CD 9c of FIGS. 1A-1C) is positioned at the focus of the light beam of the corresponding wavelength ($\lambda 1$, $\lambda 2$, and $\lambda 3$ for recording regions 10a, 10b, and 10c, respectively) in order to properly record signals and reproduce recorded signals. FIGS. 1A-1C show arrangements where the optical recording media is an AOD 9a, a DVD 9b, and a CD 9c, respectively.

In the recording region 10, pits carrying signal information are arranged in tracks. The reflected light of a laser beam 11 is made incident onto the half mirror 6 by way of the objective optical system 8 and the collimator lens 7 while carrying the signal information, and the reflected light is transmitted through the half mirror 6. The transmitted light is then incident on a four-part photodiode 13. The respective quantities of light received at each of the four parts of the four-part photodiode 13 are converted to electrical signals that are processed using an operation device (not shown in the drawings) in order to obtain data signals and respective error signals for focusing and tracking.

The objective optical system 8 of the present embodiment, as shown in FIGS. 1A-1C and FIG. 5, includes a diffractive optical element $L_1$ that is formed by cementing together two lens elements $L_{11}$ and $L_{12}$ formed from different materials. The cemented surface of the two lens elements includes a phase function $\Phi$, as will be discussed in detail later, which results in the cemented surface being an optical diffractive surface so as to enable desired focusing of the objective optical system 8 for all three light beams having different wavelengths from each other that enter into the objective optical system 8 as collimated light. An objective lens $L_2$ is arranged between the diffractive optical element $L_1$ and the optical recording medium 10 (or 10a, 10b, or 10c). The desired focusing is achieved by the refractive and diffractive properties of the objective optical system 8, including the refractive and diffractive properties of the cemented surface.

Figure 3A:
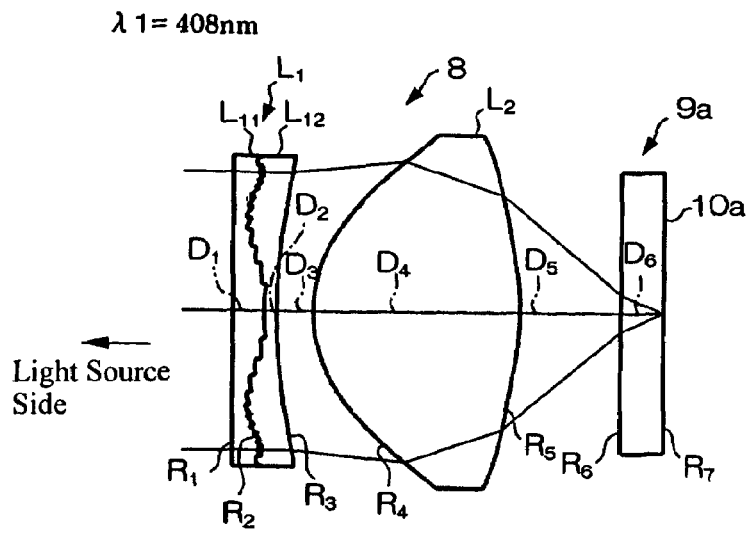
FIGS. 3A-3C are schematic diagrams that depict cross-sectional views of the objective optical system of Embodiment 2 of the present invention, with FIG. 3A showing the operation of the objective optical system when used with the first optical recording medium 9a, with FIG. 3B showing the operation of the objective optical system when used with the second optical recording medium 9b, and with FIG. 3C showing the operation of the objective optical system when used with the third optical recording medium 9c.
Figure 3B:
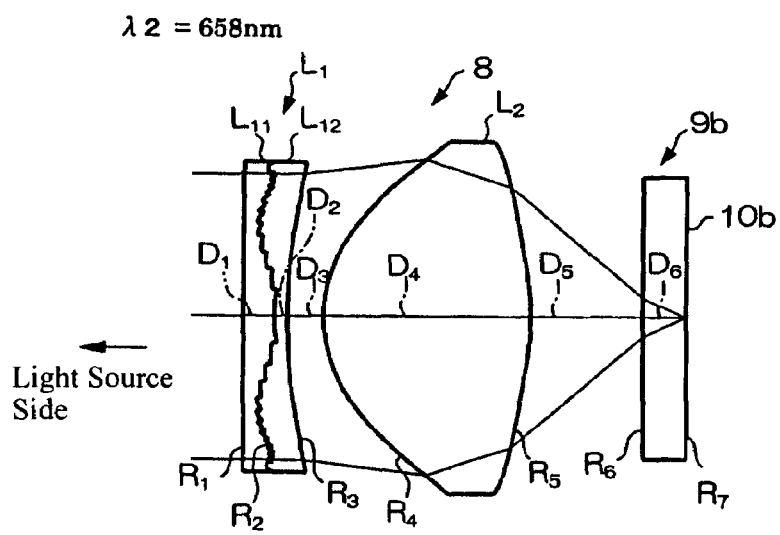
Figure 3C:
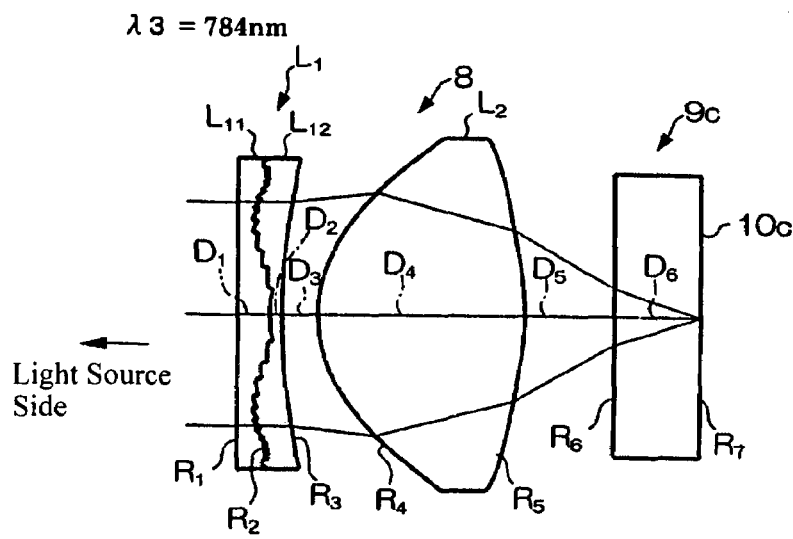

In FIGS. 1A-1C, the radii of curvature of the surfaces of the various optical elements of Embodiment 1, including the lens surfaces, are referenced by the letter R followed by a subscript denoting their order from the light source side of the objective optical system 8, from $R_1$ to $R_7$. Similarly, the on-axis surface spacings along the optical axis of the various optical surfaces are referenced by the letter D followed by a subscript denoting their order from the light source side of the objective optical system 8, from $D_1$ to $D_6$. FIGS. 3A-3C similarly illustrate radii of curvature and on-axis surfaces spacings of the various optical elements of Embodiment 2, and the same references numerals are used in FIGS. 3A-3C for corresponding optical elements.

In the case of using two types of optical recording media with different disk thicknesses, a technique for determining a diffractive optical surface that results in the optimization of the spherical aberration relative to two corresponding light beams of different wavelengths is conventionally known. For these two different types of optical recording media, the difference in thickness of the protective layer substrates results in a major difference in spherical aberration generated by the different substrates. However, by properly designing the diffractive optical surface, a construction with different converging and focusing effects at the two different wavelengths can be achieved that enables excellent correction of relevant aberrations, including spherical aberration. Therefore, the objective optical system can be used as desired for any of the optical recording media. It also becomes possible to have all of the light beams from the light source enter into the objective optical system as collimated light, thus increasing the degree of freedom in the arrangement of the optical system. Thus, the objective optical system 8 of the present embodiment may be considered an objective optical system that further advances prior art objective optical systems and that allows readily obtaining a desirable design for focusing three light beams of different wavelengths appropriately on a corresponding optical recording medium.

According to the objective optical system and the optical pickup device of the present invention, cementing two lens elements that are formed of different materials from each other at a diffractive surface results in the configuration of a diffractive optical element. The establishment of the diffractive surface on this cemented surface enables focusing each light beam of a different wavelength as desired on each of the three types of optical recording media. Each of the three light beams enters the objective optical system as substantially collimated light and is focused onto each recording region of the corresponding optical recording medium, respectively, while balancing diffraction efficiency and optical performance. In other words, even with (a) three optical recording media and light beams of three different wavelengths being used, (b) the numerical apertures of the objective optical system for the three light beams of different wavelengths not being all the same, and (c) the thicknesses of the protective layer substrates of the recording media not being all the same, by coordinating the choices of the materials of the two lens elements that are cemented together, the diffraction efficiency of the diffractive surface can be adjusted and dramatic improvement in the degree of freedom in determining the diffractive and refractive effects can be achieved.

For example, when information is recorded on or reproduced from a particular optical recording medium, cementing together two materials that have extremely similar refractive indexes for the wavelength of the light beam being used in order to form the diffractive optical element enables restraining the diffractive effect of the diffractive optical surface. Even in the case of recording information on or reproducing information from three types of optical recording media, balancing both the diffraction efficiency and the optical performance in one type of optical recording medium can be achieved by coordinating the choices of the two materials, and the balancing of both the diffraction efficiency and the optical performance for the other two types of optical recording media may be achieved by choices related to other optical elements so that when each collimated light beam that has entered the objective optical system is focused onto a corresponding optical recording region of the optical recording medium, the diffraction efficiency and the optical performance are readily properly balanced, despite this having been a difficult problem in the prior art.

Furthermore, as described above, since the diffractive optical element is separated from an objective lens that has a large refractive power, in comparison to the instance when the diffractive optical surface is formed on the surface of the objective lens at the light source side, the shape of the base for the diffractive optical element structure is nearly planar. In this instance, the processing accuracy on the occasion of forming the diffractive optical surface is drastically improved, and the angle of incidence of the luminous flux that enters into this diffractive optical surface, as well as the angle of emission of the luminous flux that is emitted from this diffractive optical surface, can be comparatively small, so both the optical performance and the diffraction efficiency can be improved.

As a conventional objective optical system equipped with a diffractive optical surface, the design is based on considering only two wavelengths, which results in the simplest construction of a diffractive optical element formed as a single lens element with a diffractive optical surface on one side. The diffractive optical surface may be either at the light source side or at the optical recording medium side at an air interface, with the lens element having a refractive index of a particular value. In contrast, because the present invention is designed for three light beams of different wavelengths from one another, the differences in the refractive indexes at both the light source side and the optical recording medium side relative to the diffractive optical surface, which greatly affect the change of the refraction and diffraction effects of light on the diffractive optical surface due to different wavelengths, are independently variable. Both the refractive index at the light source side and at the optical recording medium side of the diffractive optical surface are parameters that may be varied, which enables excellent control of the light refraction and diffraction effects at the diffractive optical surface for the light beam of each wavelength to be readily made.

In order to achieve this, the two lens elements formed from different materials are cemented to each other in order to produce a diffractive optical surface that is a cemented surface. Appropriate choices of the refractive indexes of the two lens elements enables convenient use of the objective optical system 8 under the same conditions of use for all three light beams.

In particular, because the optical pickup device is constructed so that the three light beams with wavelengths different from one another enter into the objective optical system 8 as collimated light, the distance between the collimator lens 7 and the objective optical system 8 can be optionally varied, and it also becomes easier to increase the degree of freedom in the arrangement of the optical system, for example, in allowing the optical path to be folded.

Furthermore, because the diffractive optical element $L_1$ is designed as a cemented structure, it is unnecessary to add, for example, a lens barrel for alignment purposes so that the construction may be kept simpler.

The cemented surface of the diffractive optical element $L_1$ is configured such that the diffractive optical surface is formed on the base of a rotationally symmetric aspheric surface, and the aspheric shape of the aspheric surface is defined using Equation (A) below:

$$Z=[(CY^2)/\{1+(1-K\cdot C^2\cdot Y^2)^{1/2}\}]+\Sigma(A_i\cdot Y^{2i}) \qquad \text{Equation (A)}$$

where

Z is the length (in mm) of a line drawn from a point on the aspheric lens surface at a distance Y from the optical axis to the tangential plane of the aspheric surface vertex, C is the curvature (=1/the radius of curvature, R) of the aspheric lens surface on the optical axis, Y is the distance (in mm) from the optical axis, K is the eccentricity, and $A_i$ is the ith aspheric coefficient, and the summation extends from i=2 upwards.

Additionally, it is desirable that the cross-sectional shape of the diffractive surface of the diffractive optical element $L_1$ be of a serrated shape, with the terms "serrated" or "serrated shape" being used herein to mean a so-called kinoform shape or a shape similar to that of stairs which form serrated steps. In FIGS. 1A-1C, FIGS. 3A-3C and FIG. 5, for purposes of illustration, the serrated shape of the diffractive surface is exaggerated from that of an actual diffractive surface. The diffractive surface adds a difference in optical path length equal to $m\cdot\lambda\cdot\Phi/(2\pi)$ to the diffracted light, where m is the diffractive order, $\lambda$ is the wavelength and $\Phi$ is the phase function of the diffractive surface. The phase function $\Phi$ is given by the following equation:

$$\Phi=\Sigma W_i\cdot Y^{2i} \qquad \text{Equation (B)}$$

where

Y is distance from the optical axis; and $W_i$ is a phase difference coefficient.

The phase function $\Phi$ is chosen so that the objective lens is able to focus each of the three light beams of wavelength $\lambda 1$, $\lambda 2$, and $\lambda 3$, respectively, at a different desired position for each of the first, second and third optical recording media of substrate thicknesses, T1, T2, and T3, respectively.

Furthermore, in the objective optical system 8 of Embodiment 1, both surfaces of the objective lens $L_2$ are rotationally symmetric aspheric surfaces defined according to Equation (A) above. Additionally, in the present invention, the objective lens $L_2$ has positive refractive power and the diffractive optical element $L_1$ is arranged between the light source and the objective lens $L_2$. The objective optical system is constructed so that the light beam used for the AOD 9a (the first optical recording medium) enters the objective optical system 8 as a collimated light beam. Zero-order diffracted light that is diffracted by the diffractive optical element $L_1$ is focused at a predetermined position on the recording region 10a of the AOD 9a. Similarly, light beams used for the DVD 9b (the second optical recording medium) and the CD 9c (the third optical recording medium) enter the objective optical system 8 as collimated light beams. However, first-order diffracted light that is diffracted by the diffractive optical element $L_1$ of each of these two collimated beams is focused at predetermined positions on the recording region 10b or 10c of the DVD 9b and the CD 9c, respectively.

As described above, when recording information on or reproducing information from each optical recording medium, because the light beams all enter the objective optical system as collimated light beams, the degree of freedom in the arrangement of the optical system can be enhanced. This enables a compact device to be realized. In addition, the diffraction efficiency of illumination light with a short wavelength, which is especially used for the AOD 9a, can be improved. At the same time, it is also possible to improve stability during tracking.

The specific heights of the serrate steps of the diffractive optical surface are established by taking the ratio of a diffractive light to incident light for each order of diffraction into consideration for each wavelength. Further, the outside diameter of the diffractive optical surface can be appropriately established by taking into consideration the numerical aperture and the beam diameter of the three incident laser beams 11 having different wavelengths. Additionally, it is preferable that the diffractive optical surface that is formed as the cemented surface of the diffractive optical element $L_1$ is based on an aspheric surface, and that an aspheric surface that is formed on the objective lens $L_2$ is appropriately established so that light of each wavelength focuses on the corresponding recording region 10 with excellent aberration correction.

Additionally, the diffractive surface is preferably shaped so that the order of the diffracted light of the first wavelength $\lambda 1$ (for example, 408 nm, used with an AOD) that has the largest diffracted intensity is different from the order of the diffracted light of the second wavelength $\lambda 2$ (for example, 658 nm, used with a DVD) that has the largest diffracted intensity. Moreover, preferably the order of the diffracted light of the first wavelength $\lambda 1$ that has the largest diffracted intensity is different from the order of the diffracted light of the third wavelength $\lambda 3$ (for example, 784 nm, used with a CD) that has the largest diffracted intensity.

By using light beams of different wavelengths that are diffracted into different orders as described above, proper focusing of laser beams of three different wavelengths onto an AOD, a DVD, or a CD can be achieved. In particular, in Embodiments 1 and 2 of the present invention, favorable focusing may be achieved by the order of the diffracted light of the first wavelength $\lambda 1$ (for example, 408 nm, where the quantity of diffracted light is maximized for an AOD) being the zero-order and the order of the diffracted light of the second wavelength $\lambda 2$ (for example, 658 nm, where the quantity of diffracted light is maximized for a DVD) as well as the order of the diffracted light of the third wavelength $\lambda 3$ (for example, 784 nm, where the quantity of diffracted light is maximized for a CD) both being the first-order.

As described above, the diffractive optical element $L_1$ is designed for three light beams, each with a different wavelength, by using different materials with generally different refractive indexes on each side of a cemented diffractive surface. In other words, the appropriate establishment of the refractive indexes of the two lens elements of the diffractive optical element $L_1$ for different wavelengths results in appropriate light refraction and diffraction effects on the three light beams of different wavelengths. However, the refractive indexes of the two materials may become the same for one or more of the three wavelengths depending on the particular lens materials and wavelengths used. In this case, the diffractive surface has no diffractive effect on the light beam of a wavelength where the zero-order diffracted light is maximized, resulting in nearly 100% zero-order diffracted light. In this case, the diffractive optical element $L_1$ acts as if it were a uniform single lens element, and the light beam of that wavelength is affected by the diffractive optical element $L_1$ only by the refractive effects of the outer lens surfaces of the diffractive optical element.

In fact, the percentage of zero-order diffracted light never becomes 100%, even when the difference in the refractive indexes is very small. However, a condition of having nearly 100% zero-order diffracted light can be achieved by the difference in the refractive indexes being very small for the smallest wavelength $\lambda 1$ of 408 nm for AODs, which allows higher resolution. However, when the difference in the refractive indexes is minimized for a laser beam having a wavelength of 408 nm, which is the smallest of the three wavelengths, and when used for irradiating AODs, the zero-order diffracted light may be maximized to approach the 100% value.

In this case, the diffractive optical element $L_1$ preferably satisfies the following Conditions (4) and (5):

$h2/h1 \leq 0.5$      Condition (4)

$h3/h1 \leq 0.5$      Condition (5)

where $h1 = \lambda 1 / |N1_{\lambda 1} - N2_{\lambda 1}|$ $h2 = \lambda 2 / |N1_{\lambda 2} - N2_{\lambda 2}|$ and $|N1_{\lambda 2} - N2_{\lambda 2}| \neq $ zero, $h3 = \lambda 3 / |N1_{\lambda 3} - N2_{\lambda 3}|$ and $|N1_{\lambda 3} - N2_{\lambda 3}| \neq $ zero, $N1_{\lambda 1}$ is the refractive index at the first wavelength $\lambda 1$ of the material of the lens element of the diffractive optical element $L_1$ on the light source side, $N2_{\lambda 1}$ is the refractive index at the first wavelength $\lambda 1$ of the material of the lens element of the diffractive optical element $L_1$ on the optical recording medium side, $N1_{\lambda 2}$ is the refractive index at the second wavelength $\lambda 2$ of the material of the lens element of the diffractive optical element $L_1$ on the light source side, $N2_{\lambda 2}$ is the refractive index at the second wavelength $\lambda 2$ of the material of the lens element of the diffractive optical element $L_1$ on the optical recording medium side, $N1_{\lambda 3}$ is the refractive index at the third wavelength $\lambda 3$ of the material of the lens element of the diffractive optical element $L_1$ on the light source side, and $N2_{\lambda 3}$ is the refractive index at the third wavelength $\lambda 3$ of the material of the lens element of the diffractive optical element $L_1$ on the optical recording medium side.

Thus, h1 is equal to infinity when $N1_{\lambda 1} - N2_{\lambda 1}$ is equal to zero, that is, when the refractive index $N1_{\lambda 1}$ of the material of the first lens element at the first wavelength $\lambda 1$ is equal to the refractive index $N2_{\lambda 1}$ of the material of the second lens element at the first wavelength $\lambda 1$. In that case, both h2/h1 of Condition (4) and h3/h1 of Condition (5) are also equal to zero.

When the serrated-shaped step height is designed so that the amount of first-order diffracted light is maximized for a laser beam of the second wavelength $\lambda 2$ (for example, 658 nm, used with a DVD) by satisfying Condition (4) above, the amount of zero-order diffracted light becomes a maximum for a laser beam of the first wavelength $\lambda 1$ (for example, 408 nm, used with an AOD). Moreover, when the serrated step height is designed so that the amount of diffracted light of the first-order is maximized for a laser beam of the third wavelength $\lambda 3$ (for example, 784 nm, used with a CD) by satisfying Condition (5) above, the amount of zero-order diffracted light is maximized for the first wavelength $\lambda 1$. The amount of zero-order diffracted light of wavelength $\lambda 1$ favorably increases as the values of h2/h1 and h3/h1 approach zero and the values of Conditions (4) and (5) are within the allowable ranges.

As described above, the configuration of the diffractive surface of the diffractive optical element $L_1$ is such that the amount of diffracted light of zero-order or first-order of the light beams of the three different wavelengths are maximized in a highly effective manner by using steps of serrated shape that are shallow so that production of the diffractive optical surface is relatively easy.

Additionally, it is preferable that the surface of the diffractive optical element $L_1$ on the optical recording medium side be an aspheric surface. The aspheric configuration may be expressed by aspheric Equation (A) above or a similar equation. Using an aspheric surface enables excellent correction of aberrations for light beams of all three wavelengths in order to provide excellent focusing and high-performance recording and reproducing of information with the three different optical recording media.

Furthermore, it is preferable that the surface of the diffractive optical element $L_1$ on the light source side be planar. The design of this surface to be a plane enables a state where an incident collimated light beam can enter into the diffractive optical surface without deflection, thus enabling the optical performance and the diffraction efficiency to be improved.

In Embodiments 1 and 2 of the objective optical system 8 of the present invention, the diffractive optical element $L_1$ that has the diffractive optical surface is separated from the objective lens $L_2$, which provides a light convergence function, and both surfaces of the objective lens $L_2$ are expressed by Equation (A) above.

As described above, the diffractive optical element $L_1$ is separated from the objective lens $L_2$ that has a large refractive power, even though the diffractive optical surface is formed on an aspheric surface (as shown, for example, in FIGS. 1A-1C, FIGS. 3A-3C and FIG. 5). As compared to the case where the diffractive surface is formed on a surface of the objective lens $L_2$ at the light source side, the surface where the diffractive optical element structure is formed is more nearly planar. This enables processing accuracy during formation of the diffractive optical surface to be dramatically improved, and the angles of incidence of light rays of the collimated light beam traveling in the direction of the optical axis that enter the diffractive surface and the angles of emission of light rays emitted from this diffractive surface can be comparatively small, which enables both the optical performance and the diffraction efficiency to be improved.

Embodiments 1 and 2 of the objective optical systems 8 and recording media 9 arrangement of the present invention will now be described individually with further reference to the drawings.

Embodiment 1

As described previously, FIGS. 1A-1C are schematic diagrams that depict cross-sectional views of the objective optical system according to Embodiment 1 of the present invention, with FIG. 1A showing the operation of the objective optical system when used with a first optical recording medium 9a, with FIG. 1B showing the operation of the objective optical system when used with a second optical recording medium 9b, and with FIG. 1C showing the operation of the objective optical system when used with a third optical recording medium 9c. Additionally, as described previously, FIG. 5 is a schematic diagram of an optical pickup device using the objective optical system according to Embodiment 1 of FIGS. 1A-1C.

As shown in FIGS. 1A-1C, the objective optical system 8 includes, arranged in order along an optical axis from a light source side, a diffractive optical element $L_1$ and an objective lens $L_2$. The diffractive optical element $L_1$ is a cemented structure of two lens elements $L_{11}$ and $L_{12}$, and the cemented surface ($R_2$) and both surfaces of the objective lens $L_2$ are aspheric surfaces. Furthermore, a diffractive surface is formed on the cemented surface.

As indicated in FIGS. 1A-1C, the objective optical system 8 favorably focuses light of each wavelength, $\lambda 1$ of 408 nm, $\lambda 2$ of 658 nm, and $\lambda 3$ of 784 nm, onto a respective recording region 10a, 10b, or 10c of respective recording media 9a, 9b, and 9c, which are an AOD, a DVD, and a CD, respectively. Additionally, as shown in FIGS. 1A-1C, the objective optical system operates with an infinite conjugate on the light source side using the substantially collimated light beams of all three wavelengths. Furthermore, each of the three light beams are used alternatively, emitting or not emitting light depending on the optical recording medium being used.

Table 1 below lists the surface #, in order from the light source side, the surface type or radius of curvature (in this case, the radii of curvature are given for planar surfaces, which have a radius of curvature of infinity), the on-axis surface spacing (in mm) between surfaces for the three used wavelengths ($\lambda 1$=408 nm for the AOD 9a, $\lambda 2$=658 nm for the DVD 9b, and $\lambda 3$=784 nm for the CD 9c), and the refractive indexes at the three used wavelengths for the objective optical system 8 of Embodiment 1.

TABLE 1

| # | Surface Type or Radius of Curvature | On Axis Surface Spacing | | | Refractive Index | | |
|---|---|---|---|---|---|---|---|
| | | $\lambda 1$ = 408 nm | $\lambda 2$ = 658 nm | $\lambda 3$ = 784 nm | $\lambda 1$ = 408 nm | $\lambda 2$ = 658 nm | $\lambda 3$ = 784 nm |
| 1 | ∞ | 0.200 | 0.200 | 0.200 | 1.55869 | 1.52426 | 1.52127 |
| 2 | diffractive, aspheric | 0.500 | 0.500 | 0.500 | 1.55637 | 1.54076 | 1.53704 |
| 3 | −77.691 | 0.500 | 0.500 | 0.500 | 1.00000 | 1.00000 | 1.00000 |
| 4 | aspheric | 2.315 | 2.315 | 2.315 | 1.55637 | 1.54076 | 1.53704 |
| 5 | aspheric | 1.340 | 1.521 | 1.203 | 1.00000 | 1.00000 | 1.00000 |
| 6 | ∞ | 0.600 | 0.600 | 1.200 | 1.62000 | 1.58000 | 1.57000 |
| 7 | ∞ | | | | | | |

Table 2 below lists, for each used wavelength, the diaphragm diameter DD (in mm), the focal length f (in mm), the numerical aperture NA, the apparent light source position, and the diffraction order of the diffracted light that is used for the objective optical system of Table 1.

TABLE 2

| | $\lambda 1$ = 408 nm | $\lambda 2$ = 658 nm | $\lambda 3$ = 784 nm |
|---|---|---|---|
| diaphragm diameter, DD | 3.96 | 4.06 | 3.18 |
| focal length, f | 3.00 | 3.15 | 3.21 |
| numerical aperture, NA | 0.65 | 0.65 | 0.5 |
| light source position | ∞ | ∞ | ∞ |
| diffraction order used | 0 | 1 | 1 |

The diffractive optical surface of the diffractive optical element $L_1$ includes concentric gratings with a serrated cross-section, and as described above is formed so as to maximize the quantity of diffracted light of zero-order for a laser beam of wavelength $\lambda 1$ of 408 nm for use with an AOD, so as to maximize the quantity of diffracted light of first-order for a laser beam of wavelength $\lambda 2$ of 658 nm for use with a DVD, and so as to maximize the quantity of diffracted light of first-order for a laser beam of wavelength $\lambda 3$ of 784 nm for use with a CD.

Table 3 below lists the values of the curvature C, the eccentricity K, and the aspheric coefficients $A_2$-$A_5$ for each aspheric surface of Embodiment 1, in order from the light source side (including the $2^{nd}$ Surface that is a cemented surface) that are used in Equation (A) above. An "E" in the data indicates that the number following the "E" is the exponent to the base 10. For example, "1.0E−2" represents the number $1.0 \times 10^{-2}$. Aspheric coefficients that are not listed in Table 3 are zero.

TABLE 3

| | $2^{nd}$ Surface (Cemented Surface) | $4^{th}$ Surface | $5^{th}$ Surface |
|---|---|---|---|
| C | 5.3911510E−1 | 5.0687604E−1 | −1.4542819E−1 |
| K | 0.2987943 | 0.0446741 | 0.0502791 |
| $A_2$ | −3.2417323E−2 | 6.6794338E−3 | 1.5994954E−2 |
| $A_3$ | −3.0967117E−2 | 2.8276838E−4 | −2.6238328E−4 |
| $A_4$ | 5.6886466E−3 | 8.6483353E−5 | −4.1031006E−4 |
| $A_5$ | 1.6788585E−5 | 1.2987121E−5 | 4.8103532E−5 |

Table 4 below lists the values of the phase difference coefficients $W_1$-$W_5$ of the 2$^{nd}$ Surface that forms a diffractive surface of the objective optical system of this embodiment that are used in Equation (B) above. Phase difference coefficients not listed in Table 4 are zero. Once again, an "E" in the data indicates that the number following the "E" is the exponent to the base 10.

TABLE 4

| | |
|---|---|
| $W_1$ | 1.0731492E+2 |
| $W_2$ | −3.3200017 |
| $W_3$ | −5.4569542 |
| $W_4$ | 7.9235381E−1 |
| $W_5$ | 4.8016288E−2 |

As is clear from Tables 1 and 2 above, the objective optical system of Embodiment 1 satisfies Conditions (1)-(3). Additionally, the objective optical system of Embodiment 1 satisfies Conditions (4) and (5) as set forth in Table 5 below, based on the refractive index values at the three wavelengths, $\lambda 1=408$ nm, $\lambda 2=658$ nm, and $\lambda 3=784$ nm, as set forth in Table 1 above.

TABLE 5

| Condition No. | Condition | Value |
|---|---|---|
| (4) | h2/h1 ≦ 0.5 | 0.23 |
| (5) | h3/h1 ≦ 0.5 | 0.28 |

Figure 2A:
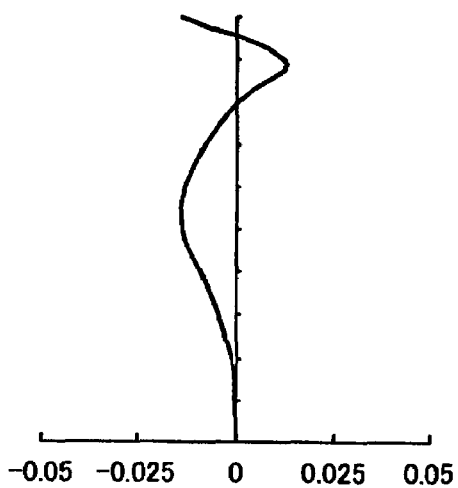
FIGS. 2A-2C illustrate wavefront aberration profiles of the light beams of the three wavelengths of FIGS. 1A-1C that are focused to spots by the objective optical system according to Embodiment 1 of the present invention, with FIG. 2A illustrating the wavefront aberration profile of the light beam of the first wavelength that is focused to a spot for the first optical recording medium, with FIG. 2B illustrating the wavefront aberration profile of the light beam of the second wavelength that is focused to a spot for the second optical recording medium, and with FIG. 2C illustrating the wavefront aberration profile of the light beam of the third wavelength that is focused to a spot for the third optical recording medium, with the numbers on the abscissa in each figure indicating the wavefront aberration in units of the specified wavelength.
Figure 2B:
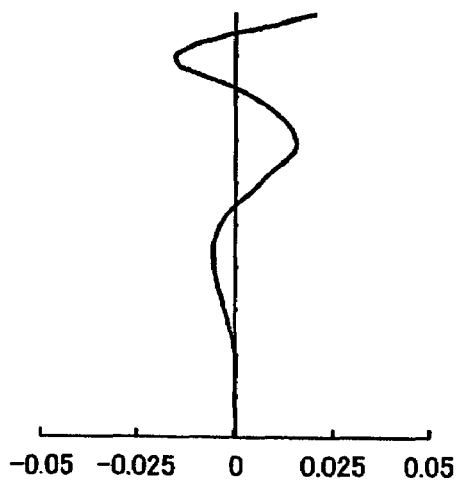
Figure 2C:
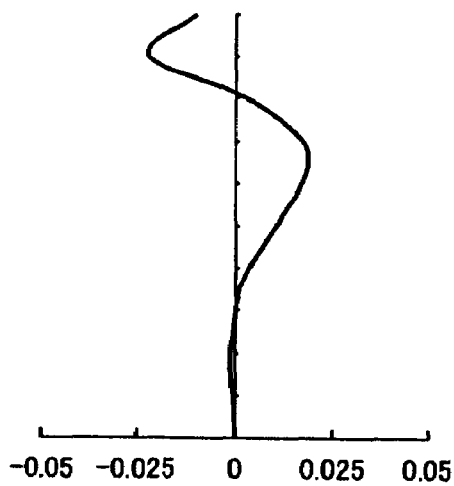

FIGS. 2A-2C illustrate wavefront aberration profiles of the light beams of three wavelengths being focused to a spot by the objective optical system of Embodiment 1 of the present invention, with FIG. 2A illustrating the wavefront aberration profile of the light beam of the first wavelength being focused to a spot for the first optical recording medium 9a which is an AOD, with FIG. 2B illustrating the wavefront aberration profile of the light beam of the second wavelength being focused to a spot for the second optical recording medium 9b which is a DVD, and with FIG. 2C illustrating the wavefront aberration profile of the light beam of the third wavelength being focused to a spot for the third optical recording medium 9c which is a CD. As shown by FIGS. 2A-2C, the wavefront aberrations are favorably corrected for all three light beams.

Embodiment 2

As described previously, FIGS. 3A-3C are schematic diagrams that depict cross-sectional views of the objective optical system according to Embodiment 2 of the present invention, with FIG. 3A showing the operation of the objective optical system when used with a first optical recording medium 9a, with FIG. 3B showing the operation of the objective optical system when used with a second optical recording medium 9b, and with FIG. 3C showing the operation of the objective optical system when used with a third optical recording medium 9c. The objective optical system 8 of FIGS. 3A-3C according to Embodiment 2 is similar to that of FIGS. 1A-1C according to Embodiment 1. However, in addition to Embodiment 2 including aspheric surfaces for surfaces that are aspheric surfaces in Embodiment 1, in Embodiment 2, the surface of the diffractive optical element $L_1$ at the optical recording medium side is also an aspheric surface. Also, in Embodiment 2, non-zero aspheric coefficients up to $A_{10}$ are included to define the aspheric shape of the second surface, which is the diffractive optical surface, rather than only up to $A_5$ as in Embodiment 1. In addition, in Embodiment 2, non-zero phase difference coefficients up to $W_{10}$ are included to define the diffractive optical surface, rather than only up to $W_5$ as in Embodiment 1. As described previously, FIG. 5 is a schematic diagram of an optical pickup device using the objective optical system according to the embodiments of the invention.

As shown in FIGS. 3A-3C, the objective optical system 8 includes, arranged in order along an optical axis from a light source side, a diffractive optical element $L_1$ and an objective lens $L_2$. The diffractive optical element $L_1$ is a cemented structure of two lens elements $L_{11}$ and $L_{12}$, and the cemented surface $R_2$, the optical recording medium side surface of the diffractive optical element $L_1$, and both surfaces of the objective lens $L_2$ are aspheric surfaces. Furthermore, a diffractive surface is formed on the cemented surface.

As indicated in FIGS. 3A-3C, the objective optical system 8 favorably focuses light of each wavelength, $\lambda 1$ of 408 nm, $\lambda 2$ of 658 nm, and $\lambda 3$ of 784 nm, onto a respective recording region 10a, 10b, or 10c of respective recording media 9a, 9b, and 9c, which are an AOD, a DVD, and a CD, respectively. Additionally, as shown in FIGS. 3A-3C, the objective optical system operates with an infinite conjugate on the light source side using substantially collimated light beams for each of the three wavelengths. Furthermore, each of the three light beams are used alternatively, emitting or not emitting light depending on the optical recording medium being used.

Table 6 below lists the surface #, in order from the light source side, the surface type or radius of curvature (in this case, the radii of curvature are given for planar surfaces, which have a radius of curvature of infinity), the on-axis surface spacing (in mm) between surfaces for the three used wavelengths ($\lambda 1=408$ nm for the AOD 9a, $\lambda 2=658$ nm for the DVD 9b, and $\lambda 3=784$ nm for the CD 9c), and the refractive indexes at the three used wavelengths for the objective optical system 8 of Embodiment 2.

TABLE 6

| # | Surface Type or Radius of Curvature | On Axis Surface Spacing | | | Refractive Index | | |
|---|---|---|---|---|---|---|---|
| | | $\lambda 1 = 408$ nm | $\lambda 2 = 658$ nm | $\lambda 3 = 784$ nm | $\lambda 1 = 408$ nm | $\lambda 2 = 658$ nm | $\lambda 3 = 784$ nm |
| 1 | ∞ | 0.500 | 0.500 | 0.500 | 1.55637 | 1.54076 | 1.53704 |
| 2 | diffractive, aspheric | 0.100 | 0.100 | 0.100 | 1.55869 | 1.52426 | 1.52127 |
| 3 | aspheric | 0.500 | 0.500 | 0.500 | 1.00000 | 1.00000 | 1.00000 |
| 4 | aspheric | 2.919 | 2.919 | 2.919 | 1.55637 | 1.54076 | 1.53704 |
| 5 | aspheric | 1.402 | 1.560 | 1.242 | 1.00000 | 1.00000 | 1.00000 |
| 6 | ∞ | 0.600 | 0.600 | 1.200 | 1.62000 | 1.58000 | 1.57000 |
| 7 | ∞ | | | | | | |

Table 7 below lists, for each used wavelength, the diaphragm diameter DD (in mm), the focal length f (in mm), the numerical aperture NA, the apparent light source position, and the diffraction order of the diffracted light that is used for the objective optical system of Table 6.

TABLE 7

|  | λ1 = 408 nm | λ2 = 658 nm | λ3 = 784 nm |
|---|---|---|---|
| diaphragm diameter, DD | 3.94 | 4.05 | 3.16 |
| focal length, f | 3.00 | 3.12 | 3.17 |
| numerical aperture, NA | 0.65 | 0.65 | 0.50 |
| light source position | ∞ | ∞ | ∞ |
| diffraction order used | 0 | 1 | 1 |

The diffractive optical surface of the diffractive optical element $L_1$ includes concentric gratings with a serrated cross-section, and, as described above, is formed so as to maximize the quantity of diffracted light of zero-order for a laser beam having a wavelength λ1 of 408 nm for use with an AOD, so as to maximize the quantity of diffractive light of first-order for a laser beam having a wavelength λ2 of 658 nm for use with a DVD, and so as to maximize the quantity of diffracted light of first-order for a laser beam having a wavelength λ3 of 784 nm for use with a CD.

Table 8 below lists the values of the curvature C, the eccentricity K, and the aspheric coefficients $A_2$-$A_{10}$ of each aspheric surface of this embodiment, numbered from the light source side and including the cemented surface, that are used in Equation (A) above. An "E" in the data indicates that the number following the "E" is the exponent to the base 10. For example, "1.0E-2" represents the number $1.0 \times 10^{-2}$. Aspheric coefficients that are not listed in Table 8 are zero.

TABLE 8

|  | 2nd Surface (Cemented Surface) | 3rd Surface | 4th Surface | 5th Surface |
|---|---|---|---|---|
| C | -5.5204607E-1 | 1.0417328E-1 | 5.1219005E-1 | -3.0218844E-1 |
| K | 0.3001462 | 1.0000000 | 0.0441911 | 0.0506101 |
| $A_2$ | 5.2638198E-2 | 7.2338799E-3 | 1.0297045E-2 | 4.6784875E-2 |
| $A_3$ | 2.7149214E-2 | -2.6279446E-3 | -2.1340861E-3 | -1.2628699E-2 |
| $A_4$ | -2.7057046E-3 | 1.9657754E-4 | 4.0231899E-4 | 1.7548273E-3 |
| $A_5$ | -4.7882262E-3 | 8.4948510E-6 | -3.9804744E-5 | -1.0461915E-4 |
| $A_6$ | 2.8083397E-3 | 0 | 0 | 0 |
| $A_7$ | -9.3846491E-4 | 0 | 0 | 0 |
| $A_8$ | 2.3148217E-4 | 0 | 0 | 0 |
| $A_9$ | -3.9065067E-5 | 0 | 0 | 0 |
| $A_{10}$ | 2.9643133E-6 | 0 | 0 | 0 |

Table 9 below lists the values of the phase difference coefficients $W_1$-$W_{10}$ of the 2nd Surface that forms a diffractive surface of the objective optical system of this embodiment that are used in Equation (B) above. Phase difference coefficients not listed in Table 9 are zero. Once again, an "E" in the data indicates that the number following the "E" is the exponent to the base 10.

TABLE 9

| $W_1$ | 1.0750848E+2 |
|---|---|
| $W_2$ | -6.6959855 |
| $W_3$ | -6.5486802 |
| $W_4$ | 1.7287155 |
| $W_5$ | -8.5922924E-2 |
| $W_6$ | 5.0691230E-3 |
| $W_7$ | -1.6725571E-2 |
| $W_8$ | 2.7446694E-3 |

TABLE 9-continued

| $W_9$ | 8.9042501E-4 |
|---|---|
| $W_{10}$ | -1.7239318E-4 |

As is clear from Tables 6 and 7 above, the objective optical system of Embodiment 2 described above satisfies Conditions (1)-(3). Additionally, the objective optical system of the embodiment described above satisfies Conditions (4) and (5) as set forth in Table 10 below, based on the refractive index values at the three wavelengths, λ1=408 nm, λ2=658 nm, and λ3=784 nm, as set forth in Table 6 above.

TABLE 10

| Condition No. | Condition | Value |
|---|---|---|
| (4) | h2/h1 ≦ 0.5 | 0.23 |
| (5) | h3/h1 ≦ 0.5 | 0.28 |

Figure 4A:
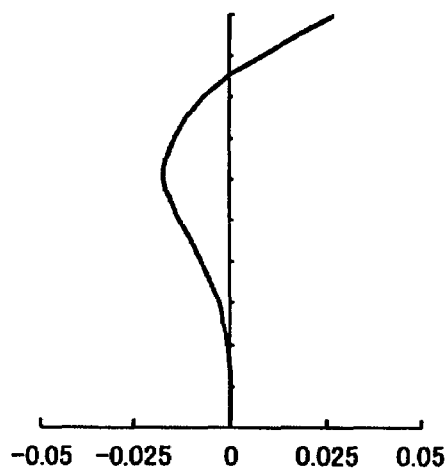
FIGS. 4A-4C illustrate wavefront aberration profiles of the light beams of the three wavelengths of FIGS. 3A-3C that are focused to spots by the objective optical system according to Embodiment 2 of the present invention, with FIG. 4A illustrating the wavefront aberration profile of the light beam of the first wavelength that is focused to a spot for the first optical recording medium, with FIG. 4B illustrating the wavefront aberration profile of the light beam of the second wavelength that is focused to a spot for the second optical recording medium, and with FIG. 4C illustrating the wavefront aberration profile of the light beam of the third wavelength that is focused to a spot for the third optical recording medium, with the numbers on the abscissa in each figure indicating the wavefront aberration in units of the specified wavelength.
Figure 4B:
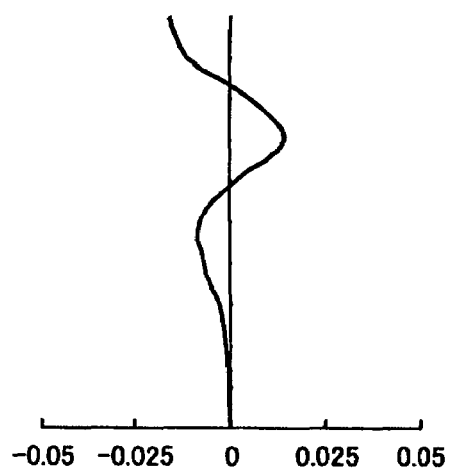
Figure 4C:
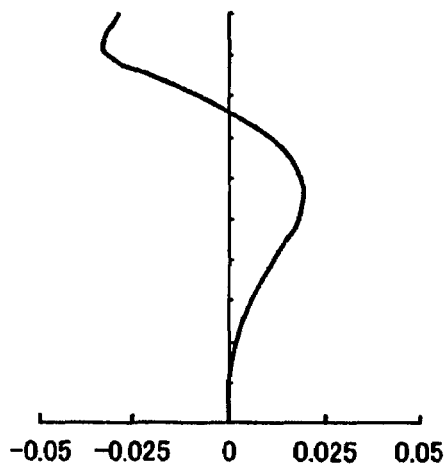

FIGS. 4A-4C illustrate wavefront aberration profiles of the light beams of three wavelengths being focused to a spot by the objective optical system of Embodiment 2 of the present invention, with FIG. 4A illustrating the wavefront aberration profile of the light beam of the first wavelength being focused to a spot for the first optical recording medium 9a which is an AOD, with FIG. 4B illustrating the wavefront aberration profile of the light beam of the second wavelength being focused to a spot for the second optical recording medium 9b which is a DVD, and with FIG. 4C illustrating the wavefront aberration profile of the light beam of the third wavelength being focused to a spot for the third optical recording medium 9c which is a CD. As shown by FIGS. 4A-4C, the wavefront aberrations are favorably corrected for all three light beams.

The objective optical system of the present invention can be modified in various ways without being restricted to that of the specific embodiments described above. Similarly, the optical pickup device of the present invention can be modified in various ways. For example, plastic material can be used as the material of one or both of the lens elements $L_1$ and $L_2$ in order to reduce the weight and cost of the objective optical system. Additionally, as the material for one of the lens elements $L_1$ or $L_2$, a heat or light cured resin may be used so that a so-called multiplexed aspheric lens may be made by replica processing that inexpensively produces a cemented aspheric lens with a diffractive surface. For example, in the above embodiments, the lens element $L_{11}$ of the diffractive optical element $L_1$ at the light source side can be formed by applying an ultraviolet curing type resin onto the diffractive optical surface at the light source side within the lens element $L_{12}$, situated at the optical recording medium side within the diffractive optical element $L_1$, and by irradiating a predetermined ultraviolet ray while the resin is pressed using a predetermined metal mold.

Furthermore, in Embodiments 1 and 2 described previously, the surface of the diffractive optical element $L_1$ at the light source side is designed to be a plane. However, it is not limited to being a plane.

Additionally, in the embodiments described previously, the diffractive surface is designed so that the amounts of first-order diffracted laser light for a wavelength λ2 of 658 nm used with a DVD and for a wavelength λ3 of 784 nm used with a CD are respectively maximized. However, the diffractive optical surface can be established so that the diffractive order having the maximum amount of light diffracted for a laser beam of the second wavelength λ2 is different from the diffractive order having the maximum amount of light diffracted for a laser beam of the third wavelength λ3.

Also, the diffractive surface of the objective optical system may be designed so that the diffracted light intensity at one or more wavelengths is maximized at another predetermined diffractive order. In any case, it is desirable to diffract, as nearly as possible, 100% of the incident light of a given wavelength into the predetermined diffractive order for maximum efficiency.

Furthermore, the optical recording media to be recorded and reproduced in the optical pickup device of the present invention are not restricted to the combination of an AOD, a DVD and a CD. The present invention relates generally for use with the optical recording media where Conditions (1)-(3) are satisfied. For example, instead of a design based on AOD recording and reproducing at one of the three wavelengths, a design may be based on Blu-ray technology, which may be used with a numerical aperture of 0.85, a Blu-ray disk substrate thickness of 0.1 mm and a light beam having a wavelength of 405 nm.

Additionally, when an AOD, a DVD and a CD are used as optical recording media, the wavelengths of the light beams used are not restricted to the particular embodiments described above. A light beam having a wavelength other than the wavelength of a light beam in use for an AOD of 408 nm, other than the wavelength of a light beam in use for a DVD of 658 nm, and/or other than the wavelength of a light beam in use for a CD of 784 nm can be used as long as the standards for satisfactory focusing of the light beam, as described above, are satisfied and the wavelength used for each optical recording medium is within the acceptable standard range for the corresponding optical recording medium. Similar considerations apply to variations in numerical apertures of the objective optical systems for a given light beam with a given wavelength and to variations in disk thicknesses for optical recording media used with a given light beam of a given wavelength.

Also, the objective lens for use with optical recording media and the optical pickup device of the present invention are not limited to use with three types of optical recording media. Even when different wavelength light beams are used with only two optical recording media, the light beams may be incident on the light source side of the objective lens as substantially parallel beams, and the objective lens may produce very favorable and efficient focusing of the different wavelength light beams on two optical recording media. Additionally, different wavelength light beams may also be used with four or more kinds of optical recording media in a single optical pickup device.

Furthermore, it is possible to omit the collimator lens 7 depending on the circumstances. It is also possible to detect a tracking error using the three beams by inserting a grating between the semiconductor lasers 1a-1c and the half mirror 6.

Additionally, although in the optical pickup devices described above three light sources that output light beams having wavelengths that differ from each other are used, a single light source that outputs two light beams having wavelengths different from each other can be used as a light source. For example, light of different wavelengths may be emitted from adjacent output ports. In such a case, instead of using prisms 2a and 2b as shown in FIG. 5, a single prism may be used in order to combine the light beams. Furthermore, in this optical pickup device, an aperture and/or aperture control device that has a wavelength selectivity may be arranged at the light source side of the objective optical system. Such variations are not to be regarded as a departure from the spirit and scope of the invention. Rather, the scope of the invention shall be defined as set forth in the following claims and their legal equivalents. All such modifications as would be obvious to one skilled in the art are intended to be included within the scope of the following claims.

What is claimed is:

1. An objective optical system having a light source side and a recording media side for receiving light from the light source side and focusing the light on an optical recording medium in an optical pickup device, comprising:
    a diffractive optical element that consists of, arranged in order along an optical axis from the light source side, a first lens element and a second lens element that are made of different materials and that are cemented together at a diffractive surface;
wherein
    the diffractive optical element is on the light source side of the objective optical system;
    the diffractive surface has a phase function that enables the objective optical system to focus light of a first wavelength λ1 incident from the light source side of the objective optical system at a first numerical aperture NA1 onto a desired portion of a first optical recording medium having a substrate thickness T1, enables the objective optical system to focus light of a second wavelength λ2 incident from the light source side of the objective optical system at a second numerical aperture NA2 onto a desired portion of a second optical recording medium having a substrate thickness T2, and that enables the objective optical system to focus light of a third wavelength λ3 incident from the light source side of the objective optical system at a third numerical aperture NA3 onto a desired portion of a third optical recording medium having a substrate thickness T3; and
    the following conditions are satisfied:

$$NA1 \geq NA2 \geq NA3$$

$$\lambda1 < \lambda2 < \lambda3$$

$$T1 \leq T2 < T3.$$

2. The objective optical system according to claim 1, and further comprising:
    on the recording media side of the diffractive optical element, a lens component having positive refractive power and having a rotationally symmetric aspheric surface on each of its sides.

3. The objective optical system according to claim 2, wherein the objective optical system consists of the diffractive optical element and said lens component.

4. The objective optical system according to claim 3, wherein said lens component consists of a single lens element.

5. The objective optical system according to claim 2, wherein:
the diffractive surface has a serrated shape; and
the diffractive surface is shaped so that the order of the diffracted light of the first wavelength λ1 having the largest diffracted intensity is different from the order of the diffracted light of the second wavelength λ2 having the largest diffracted intensity, and the order of the diffracted light of the first wavelength λ1 having the largest diffracted intensity is also different from the order of the diffracted light of the third wavelength λ3 having the largest diffracted intensity.

6. The objective optical system according to claim 3, wherein:
the diffractive surface has a serrated shape; and
the diffractive surface is shaped so that the order of the diffracted light of the first wavelength λ1 having the largest diffracted intensity is different from the order of the diffracted light of the second wavelength λ2 having the largest diffracted intensity, and the order of the diffracted light of the first wavelength λ1 having the largest diffracted intensity is also different from the order of the diffracted light of the third wavelength λ3 having the largest diffracted intensity.

7. The objective optical system according to claim 4, wherein:
the diffractive surface has a serrated shape; and
the diffractive surface is shaped so that the order of the diffracted light of the first wavelength λ1 having the largest diffracted intensity is different from the order of the diffracted light of the second wavelength λ2 having the largest diffracted intensity, and the order of the diffracted light of the first wavelength λ1 having the largest diffracted intensity is also different from the order of the diffracted light of the third wavelength λ3 having the largest diffracted intensity.

8. The objective optical system according to claim 1, wherein the surface of the diffractive optical element on the light source side is planar.

9. The objective optical system according to claim 2, wherein the surface of the diffractive optical element on the light source side is planar.

10. The objective optical system according to claim 1, wherein the following conditions are satisfied:

$h2/h1 \leq 0.5$ $h3/h1 \leq 0.5$ where $h1 = \lambda1/|N1_{\lambda1} - N2_{\lambda1}|$, $h2 = \lambda2/|N1_{\lambda2} - N2_{\lambda2}|$ and $|N1_{\lambda2} - N2_{\lambda2}| \neq$ zero, $h3 = \lambda3/|N1_{\lambda3} - N2_{\lambda3}|$ and $|N1_{\lambda3} - N2_{\lambda3}| \neq$ zero, $N1_{\lambda1}$ is the refractive index of the material of said first lens element at the first wavelength λ1,
$N2_{\lambda1}$ is the refractive index of the material of said second lens element at the first wavelength λ1,
$N1_{\lambda2}$ is the refractive index of the material of said first lens element at the second wavelength λ2,
$N2_{\lambda2}$ is the refractive index of the material of said second lens element at the second wavelength λ2,
$N1_{\lambda3}$ is the refractive index of the material of said first lens element at the third wavelength λ3, and
$N2_{\lambda3}$ is the refractive index of the material of said second lens element at the third wavelength λ3.

11. The objective optical system according to claim 2, wherein the following conditions are satisfied:

$h2/h1 \leq 0.5$ $h3/h1 \leq 0.5$ where $h1 = \lambda1/|N1_{\lambda1} - N2_{\lambda1}|$, $h2 = \lambda2/|N1_{\lambda2} - N2_{\lambda2}|$ and $|N1_{\lambda2} - N2_{\lambda2}| \neq$ zero, $h3 = \lambda3/|N1_{\lambda3} - N2_{\lambda3}|$ and $|N1_{\lambda3} - N2_{\lambda3}| \neq$ zero, $N1_{\lambda1}$ is the refractive index of the material of said first lens element at the first wavelength λ1,
$N2_{\lambda1}$ is the refractive index of the material of said second lens element at the first wavelength λ1,
$N1_{\lambda2}$ is the refractive index of the material of said first lens element at the second wavelength λ2,
$N2_{\lambda2}$ is the refractive index of the material of said second lens element at the second wavelength λ2,
$N1_{\lambda3}$ is the refractive index of the material of said first lens element at the third wavelength λ3, and
$N2_{\lambda3}$ is the refractive index of the material of said second lens element at the third wavelength λ3.

12. The objective optical system according to claim 3, wherein the following conditions are satisfied:

$h2/h1 \leq 0.5$ $h3/h1 \leq 0.5$ where $h1 = \lambda1/|N1_{\lambda1} - N2_{\lambda1}|$, $h2 = \lambda2/|N1_{\lambda2} - N2_{\lambda2}|$ and $|N1_{\lambda2} N2_{\lambda2}| \neq$ zero, $h3 = \lambda3/|N1_{\lambda3} - N2_{\lambda3}|$ and $|N1_{\lambda3} N2_{\lambda3}| \neq$ zero, $N1_{\lambda1}$ is the refractive index of the material of said first lens element at the first wavelength λ1,
$N2_{\lambda1}$ is the refractive index of the material of said second lens element at the first wavelength λ1,
$N1_{\lambda2}$ is the refractive index of the material of said first lens element at the second wavelength λ2,
$N2_{\lambda2}$ is the refractive index of the material of said second lens element at the second wavelength λ2,
$N1_{\lambda3}$ is the refractive index of the material of said first lens element at the third wavelength λ3, and
$N2_{\lambda3}$ is the refractive index of the material of said second lens element at the third wavelength λ3.

13. The objective optical system according to claim 4, wherein the following conditions are satisfied:

$h2/h1 \leq 0.5$ $h3/h1 \leq 0.5$ where $h1 = \lambda1/|N1_{\lambda1} - N2_{\lambda1}|$, $h2 = \lambda2/|N1_{\lambda2} - N2_{\lambda2}|$ and $|N1_{\lambda2} - N2_{\lambda2}| \neq$ zero, $h3 = \lambda3/|N1_{\lambda3} - N2_{\lambda3}|$ and $|N1_{\lambda3} - N2_{\lambda3}| \neq$ zero, $N1_{\lambda1}$ is the refractive index of the material of said first lens element at the first wavelength λ1,
$N2_{\lambda1}$ is the refractive index of the material of said second lens element at the first wavelength λ1, $N1_{\lambda 2}$ is the refractive index of the material of said first lens element at the second wavelength $\lambda 2$, $N2_{\lambda 2}$ is the refractive index of the material of said second lens element at the second wavelength $\lambda 2$, $N1_{\lambda 3}$ is the refractive index of the material of said first lens element at the third wavelength $\lambda 3$, and $N2_{\lambda 3}$ is the refractive index of the material of said second lens element at the third wavelength $\lambda 3$.

14. The objective optical system according to claim 5, wherein the following conditions are satisfied:

$h2/h1 \leqq 0.5$ $h3/h1 \leqq 0.5$ where $h1 = \lambda 1/|N1_{\lambda 1} - N2_{\lambda 1}|$ $h2 = \lambda 2/|N1_{\lambda 2} - N2_{\lambda 2}|$ and $|N1_{\lambda 2} - N2_{\lambda 2}| \neq$ zero, $h3 = \lambda 3/|N1_{\lambda 3} - N2_{\lambda 3}|$ and $|N1_{\lambda 3} - N2_{\lambda 3}| \neq$ zero, $N1_{\lambda 1}$ is the refractive index of the material of said first lens element at the first wavelength $\lambda 1$, $N2_{\lambda 1}$ is the refractive index of the material of said second lens element at the first wavelength $\lambda 1$, $N1_{\lambda 2}$ is the refractive index of the material of said first lens element at the second wavelength $\lambda 2$, $N2_{\lambda 2}$ is the refractive index of the material of said second lens element at the second wavelength $\lambda 2$, $N1_{\lambda 3}$ is the refractive index of the material of said first lens element at the third wavelength $\lambda 3$, and $N2_{\lambda 3}$ is the refractive index of the material of said second lens element at the third wavelength $\lambda 3$.

15. The objective optical system according to claim 6, wherein the following conditions are satisfied:

$h2/h1 \leqq 0.5$ $h3/h1 \leqq 0.5$ where $h1 = \lambda 1/|N1_{\lambda 1} - N2_{\lambda 1}|$, $h2 = \lambda 2/|N1_{\lambda 2} - N2_{\lambda 2}|$ and $|N1_{\lambda 2} - N2_{\lambda 2}| \neq$ zero, $h3 = \lambda 3/|N1_{\lambda 3} - N2_{\lambda 3}|$ and $|N1_{\lambda 3} - N2_{\lambda 3}| \neq$ zero, $N1_{\lambda 1}$ is the refractive index of the material of said first lens element at the first wavelength $\lambda 1$, $N2_{\lambda 1}$ is the refractive index of the material of said second lens element at the first wavelength $\lambda 1$, $N1_{\lambda 2}$ is the refractive index of the material of said first lens element at the second wavelength $\lambda 2$, $N2_{\lambda 2}$ is the refractive index of the material of said second lens element at the second wavelength $\lambda 2$, $N1_{\lambda 3}$ is the refractive index of the material of said first lens element at the third wavelength $\lambda 3$, and $N2_{\lambda 3}$ is the refractive index of the material of said second lens element at the third wavelength $\lambda 3$.

16. The objective optical system according to claim 7, wherein the following conditions are satisfied:

$h2/h1 \leqq 0.5$ $h3/h1 \leqq 0.5$ where $h1 = \lambda 1/|N1_{\lambda 1} - N2_{\lambda 1}|$, $h2 = \lambda 2/|N1_{\lambda 2} - N2_{\lambda 2}|$ and $|N1_{\lambda 2} - N2_{\lambda 2}| \neq$ zero, $h3 = \lambda 3/|N1_{\lambda 3} - N2_{\lambda 3}|$ and $|N1_{\lambda 3} - N2_{\lambda 3}| \neq$ zero, $N1_{\lambda 1}$ is the refractive index of the material of said first lens element at the first wavelength $\lambda 1$, $N2_{\lambda 1}$ is the refractive index of the material of said second lens element at the first wavelength $\lambda 1$, $N1_{\lambda 2}$ is the refractive index of the material of said first lens element at the second wavelength $\lambda 2$, $N2_{\lambda 2}$ is the refractive index of the material of said second lens element at the second wavelength $\lambda 2$, $N1_{\lambda 3}$ is the refractive index of the material of said first lens element at the third wavelength $\lambda 3$, and $N2_{\lambda 3}$ is the refractive index of the material of said second lens element at the third wavelength $\lambda 3$.

17. An optical pickup device that includes the objective optical system according to claim 1.

18. An optical pickup device that includes the objective optical system according to claim 2.

19. An optical pickup device that includes the objective optical system according to claim 5.

20. An optical pickup device that includes the objective optical system according to claim 8.

* * * * *

UNITED STATES PATENT AND TRADEMARK OFFICE
CERTIFICATE OF CORRECTION

PATENT NO.         : 7,443,779 B2                                        Page 1 of 1
APPLICATION NO.  : 11/019203
DATED              : October 28, 2008
INVENTOR(S)        : Kitahara et al.

It is certified that error appears in the above-identified patent and that said Letters Patent is hereby corrected as shown below:

Title Pg, Item (57)
In the Abstract
Line 10, change "shortest wavelength $\lambda 2$" to -- shortest wavelength $\lambda 1$ --; and In col. 6
Line 10, change "$T1 \leq T2 < T3$" to -- $T1 \leq T2 \leq T3$ --.

Signed and Sealed this

Sixth Day of January, 2009

JON W. DUDAS
*Director of the United States Patent and Trademark Office*